(12) United States Patent
Ramprasad

(10) Patent No.: US 11,249,615 B2
(45) Date of Patent: Feb. 15, 2022

(54) DEVICE AND PROCESS TO TRANSITION A SMART PHONE TO A FEATURE PHONE

(71) Applicant: TracFone Wireless, Inc., Miami, FL (US)

(72) Inventor: Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 16/850,402

(22) Filed: Apr. 16, 2020

(65) Prior Publication Data

US 2020/0333943 A1 Oct. 22, 2020

Related U.S. Application Data

(60) Provisional application No. 62/868,048, filed on Jun. 28, 2019, provisional application No. 62/834,650, filed on Apr. 16, 2019.

(51) Int. Cl.
| | | |
|---|---|---|
| *H04B 5/00* | (2006.01) |
| *H04M 1/72475* | (2021.01) |
| *G06F 3/0481* | (2022.01) |
| *G06Q 20/32* | (2012.01) |
| *G06F 3/0482* | (2013.01) |
| *H04W 4/80* | (2018.01) |
| *H04M 1/60* | (2006.01) |
| *G06F 3/0488* | (2022.01) |
| *H04M 1/72436* | (2021.01) |

(52) U.S. Cl.
CPC ........ *G06F 3/04817* (2013.01); *G06F 3/0482* (2013.01); *G06F 3/0488* (2013.01); *G06Q 20/3278* (2013.01); *H04M 1/6066* (2013.01); *H04M 1/72436* (2021.01); *H04W 4/80* (2018.02)

(58) Field of Classification Search
CPC .. G06F 3/04817; G06F 3/0482; G06F 3/0488; G06Q 20/3278; H04M 1/72436; H04M 1/6066; H04M 1/72475; H04M 2250/04; H04B 5/0025; H04B 1/3816; H04B 1/3818; H04B 5/0062; H04W 4/80; H04W 12/47
See application file for complete search history.

(56) References Cited

U.S. PATENT DOCUMENTS

| | | | |
|---|---|---|---|
| 2008/0120539 A1* | 5/2008 | Stephens, Jr. | G06F 40/166 715/256 |
| 2009/0265662 A1* | 10/2009 | Bamford | G06F 3/04886 715/800 |
| 2014/0337752 A1* | 11/2014 | Cammarata | H04W 4/50 715/744 |

(Continued)

*Primary Examiner* — Andrew Wendell
(74) *Attorney, Agent, or Firm* — BakerHostetler

(57) ABSTRACT

A wireless device configured to operate both as a smart phone and a phone having basic features including: a memory configured to store a transition application; a processor configured to implement the transition application in response to a triggering component; a display configured to display a graphical user interface for controlling operation of the processor of the wireless device and the wireless device; and the processor further configured to implement the transition application in response to a triggering component to implement the graphical user interface displayed by the display to implement basic features.

20 Claims, 10 Drawing Sheets

(56) References Cited

U.S. PATENT DOCUMENTS

| | | | | |
|---|---|---|---|---|
| 2014/0344951 | A1* | 11/2014 | Brewer | G06F 21/62 |
| | | | | 726/28 |
| 2016/0301791 | A1* | 10/2016 | Kim | G04G 9/06 |
| 2017/0092153 | A1* | 3/2017 | Horbal | G06F 3/0393 |
| 2017/0228631 | A1* | 8/2017 | Larsen | G06K 19/0719 |
| 2018/0204241 | A1* | 7/2018 | Lusted | G09G 5/006 |
| 2018/0276667 | A1* | 9/2018 | Rajurkar | G06Q 20/405 |
| 2019/0227674 | A1* | 7/2019 | Yagisawa | G08C 17/02 |
| 2019/0369861 | A1* | 12/2019 | Ive | G06F 21/84 |

* cited by examiner

DEVICE AND PROCESS TO TRANSITION A SMART PHONE TO A FEATURE PHONE

CROSS REFERENCE TO PRIOR APPLICATIONS

This application claims the benefit of U.S. Provisional Application No. 62/834,650 filed on Apr. 16, 2019 and U.S. Provisional Application No. 62/868,048 filed on Jun. 28, 2019, which are both hereby incorporated by reference in their entirety for all purposes as if fully set forth herein.

BACKGROUND OF THE DISCLOSURE

1. Field of the Disclosure

The disclosure relates to a device to transition a smart phone to a feature phone. The disclosure also relates to a process to transition a smart phone to a feature phone.

2. Related Art

Many wireless device users desire the latest smart phones with numerous features and capabilities. However, certain segments of the population find that smart phones with their numerous features and capabilities difficult to use. In this regard, some wireless device users are not savvy in using smartphones, and need assistance even in changing menus etc. For example, elderly individuals, younger children, individuals with limited capacity, and the like may find using smartphones difficult, frustrating, and onerous. A simple phone having limited capabilities may be preferred. Such simple phones are often referred to as feature phones.

However, many wireless device manufacturers are no longer producing simple phones or feature phones. The limited market for such phones being a key consideration in discontinuing the manufacture of these types of feature phones. The result of this is that simple phones or feature phones are not widely available and/or are sold at a premium cost.

Additionally, due to limited market for such phones, it is costly for wireless service providers to maintain an inventory of simple phones or feature phones in part due to the need to ensure these phones operate within a network implemented or managed by the wireless service providers.

Accordingly, a smart phone that is able to operate as a simple phone or feature phone is needed.

SUMMARY OF THE DISCLOSURE

Convenience, timeliness, and reliability of wireless service providers are key factors that play into a user's experience. By developing a device and process to improve at least these factors, a more positive experience can be provided to the user. The improved experience will help retain customer base and increase the amount of customers willing to purchase wireless services from MNOs and MVNOs. In order to do so, the following needs can be addressed by enabling a smart phone to operate as a simple phone or feature phone.

The foregoing needs are met, to a great extent, by the disclosure, providing a device and process to transition a smart phone to a feature phone. In particular, the disclosure is intended to solve the challenges of using a smart phone by certain segments of the population as well as reduce the cost of maintaining an inventory of phones and the cost of ensuring network compatibility of such phones.

One general aspect includes a wireless device configured to operate both as a smart phone and a phone having basic features including a processor configured to implement a transition application; the processor further configured to implement the transition application in response to a triggering component; a display configured to display a graphical user interface for controlling operation of the processor of the wireless device and the wireless device; the processor further configured to implement the transition application in response to a triggering component to implement the graphical user interface displayed by the display to implement basic features, where the basic features include at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons; and where the triggering component includes at least one of the following: an NFC device operating in response to a NFC target, a camera device operating in response to a machine-readable code, and a SIM card. Other embodiments of this aspect include corresponding computer systems, apparatus, and computer programs recorded on one or more computer storage devices, each configured to perform the actions of the methods.

One general aspect includes a wireless device process configured to operate a wireless device as both a smart phone and a phone having basic features including implementing a transition application with a processor; implementing the transition application in response to a triggering component with the processor; displaying a graphical user interface with a display for controlling operation of the processor of the wireless device and the wireless device; implementing the transition application with the processor in response to a triggering component to implement the graphical user interface displayed by the display to implement basic features, where the basic features include at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons; and where the triggering component includes at least one of the following: an NFC device operating in response to a NFC target, a camera device operating in response to a machine-readable code, and a SIM card.

One general aspect includes a computer program product including non-transitory computer instructions to operate a wireless device as both a smart phone and a phone having basic features when the non-transitory computer instructions are executed on a processor of a wireless device, instructions including implementing a transition application with a processor; implementing the transition application in response to a triggering component with the processor; displaying a graphical user interface with a display for controlling operation of the processor of the wireless device and the wireless device; implementing the transition application with the processor in response to a triggering component to implement the graphical user interface displayed by the display to implement basic features, where the basic features include at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons; and where the triggering component includes at least one of the following: an NFC device operating in response to a NFC target, a camera device operating in response to a machine-readable code, and a SIM card. Other embodiments of this aspect include corresponding computer systems, apparatus, and computer programs recorded on one or more computer storage devices, each configured to perform the actions of the methods.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

In this specification and claims it is to be understood that reference to a wireless device is intended to encompass electronic devices such as smart phones, mobile phones, tablet computers, gaming systems, MP3 players, personal computers, PDAs, and/or the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G network, that may utilize the teachings of the present application to sell, activate, monitor, redeem, authorize, and/or track, the provisioning of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

Figure 1:
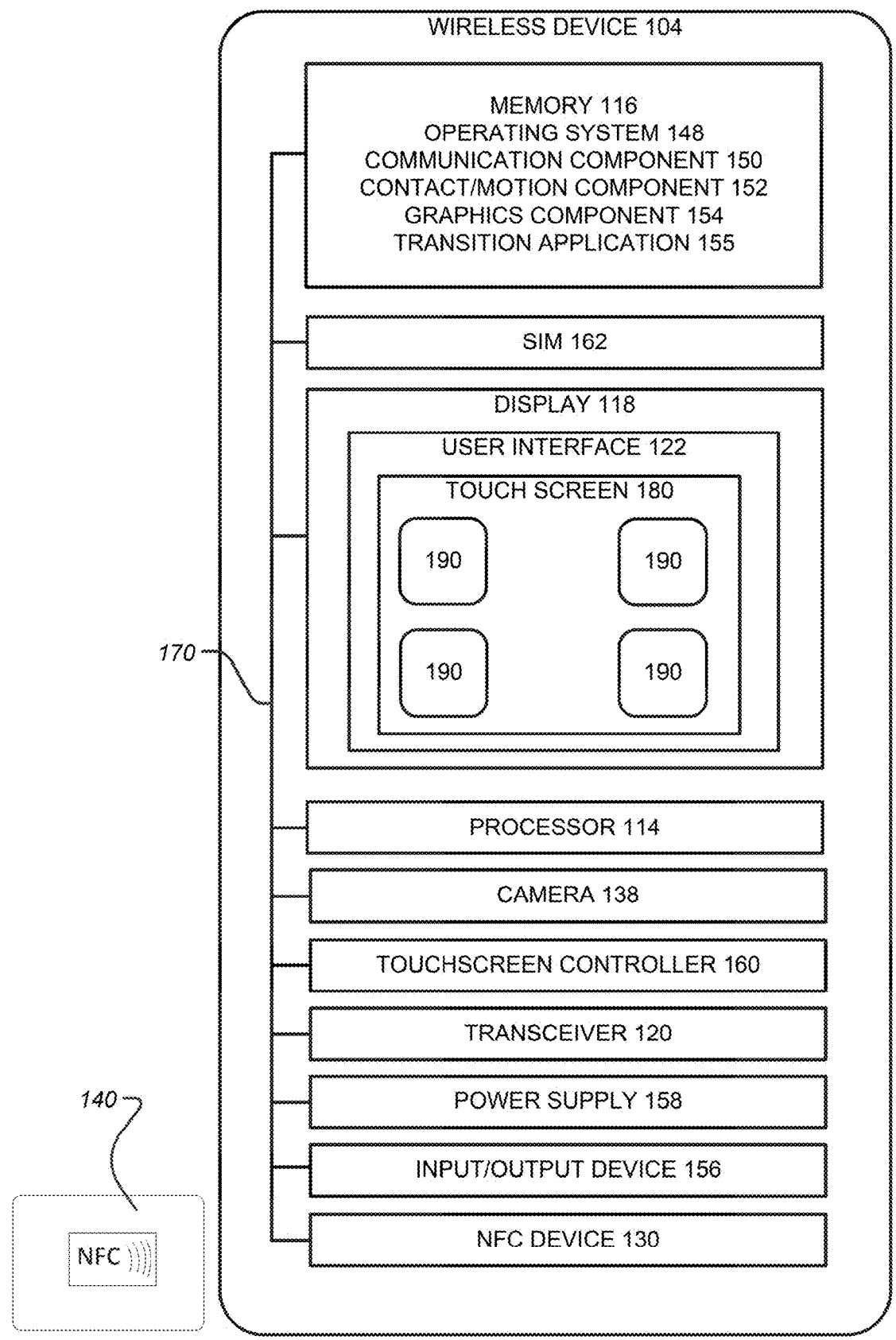
FIG. 1 illustrates a block diagram of a wireless device with exemplary components in accordance with aspects of the disclosure.

FIG. 1 illustrates a block diagram of a wireless device with exemplary components in accordance with aspects of the disclosure.

The wireless device 104 may include a processor 114, a memory 116, a transceiver 120, and a user interface 122. The processor 114 may be a central processing unit configured to execute instructions such as instructions related to software programs. Any processor can be used for the wireless device 104 as understood to those of ordinary skill in the art. In one aspect, the processor 114 may be or may include a microprocessor, a chipset, central processor unit (CPU), System-on-a-Chip (SoC), a graphics processing unit (GPU), and/or the like.

In a further aspect of the disclosure, the memory 116 of the wireless device 104 may include a transition application 155. The transition application 155 may be preinstalled, downloaded from an application store, and/or the like. In further aspects, the wireless device 104 may be configured to implement functionality consistent with the transition application 155 as described herein. However, the disclosure will reference implementation in conjunction with the transition application 155 for ease of understanding and not a specific limitation to such implementation.

In one aspect, the transition application 155 may be configured to modify operation of the wireless device 104 implemented as smartphone to operate as a feature phone. A feature phone may be defined as a type of mobile phone that may have more features than a standard cellphone but is not equivalent to a smartphone. In one aspect, a feature phone can at least make calls, receive calls, receive text messages, and send text messages. In one aspect, a feature phone can only make calls, receive calls, receive text messages, and send text messages.

In one aspect, the transition application 155 may be configured to modify operation of the wireless device 104 implemented as smartphone to operate as a simple phone.

In one aspect, the transition application 155 may be configured to modify operation of the wireless device 104 implemented as smartphone to operate as a standard cell phone.

In one aspect, the transition application 155 may be configured to modify operation of the wireless device 104 implemented as smartphone to provide limited functionality.

In one aspect, the transition application 155 may be configured to modify operation of the wireless device 104 implemented as smartphone to provide phone and text only capability. In one aspect, the transition application 155 may be configured to modify operation of the wireless device 104 implemented as smartphone to provide alpha numerical input only.

In one aspect, the transition application 155 may be configured to modify operation of the wireless device 104 implemented as smartphone to provide phone only capability. In one aspect, the transition application 155 may be configured to modify operation of the wireless device 104 implemented as smartphone to provide numerical input only.

In one aspect, the transition application 155 may be configured to modify operation of the wireless device 104 implemented as smartphone to provide limited features, limited graphical user interface features, and/or the like.

In one aspect, the transition application 155 may be configured to modify operation of the wireless device 104 implemented as smartphone to provide simplified features, simplified graphical user interface features, and/or the like.

In one aspect, the transition application 155 may be configured to modify operation of the wireless device 104 implemented as smartphone to provide a graphical user interface with no application icons (objects 190 as described below).

In one aspect, the transition application 155 may be configured to modify operation of the wireless device 104 implemented as smartphone to operate with basic features defined as a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons (objects 190 as described below) and/or the like.

In one aspect, the transition application 155 may be configured to modify operation of the wireless device 104 implemented as smartphone in response to a setting, a triggering component, a set up operation, and/or the like. Once the wireless device 104 executing the transition application 155 determines that basic operation is desired in response to a setting, a triggering component, a set up operation, and/or the like, the wireless device 104 may implement the basic features as defined herein.

The wireless device 104 may include an NFC device 130. In one aspect, the NFC device 130 may be a triggering component for triggering operation of the transition application 155. In one aspect, the NFC device 130 may be a triggering component for triggering operation of the transition application 155 in response to exchanging data with another device such as an NFC target 140. In one aspect, the NFC target 140 may be a passive target. In one aspect, the NFC target 140 may include form factors such as unpowered tags, stickers, key fobs, cards, and/or the like. In one aspect, the NFC target 140 may include a cue card form factor. In this aspect, the cue card form factor may include printed instructions for implementation of the NFC target 140 cue card form factor. In an alternative to this aspect, the cue card form factor may include a QR code that is readable with a wireless device for launching a browser that points to a website providing instructions for implementation of the NFC target 140 cue card form factor.

In one aspect, the NFC target 140 may be a sticker. In one aspect, the NFC target 140 may be arranged on the wireless device 104. In one aspect, the NFC target 140 may be arranged in the wireless device 104. In one aspect, the NFC target 140 may be arranged under a cover of the wireless device 104. In one aspect, the NFC target 140 may be arranged on or under a battery that operates as a power supply 158 of the wireless device 104. In one aspect, the NFC target 140 may be arranged on or in a peripheral device associated with the wireless device 104. In one aspect, the NFC target 140 may be arranged in close proximity (within 4 centimeters) to the wireless device 104. In one aspect, the NFC target 140 may be tapped on the wireless device 104. In one aspect, the NFC target 140 may be tapped on the wireless device 104 to launch the transition application 155.

The NFC device 130 may include one or more antennas. In one aspect, the NFC device 130 may include one or more loop antennas. In one aspect, the NFC device 130 may include two loop antennas. In one aspect, the NFC device 130 may employ electromagnetic induction between two loop antennas when the wireless device 104 and the NFC target 140 exchange information, operating within a radio frequency band.

In one aspect, the NFC device 130 may employ electromagnetic induction between two loop antennas when the wireless device 104 and the NFC target 140 exchange information, operating within the globally available unlicensed radio frequency ISM band of 13.56 MHz on ISO/IEC 18000-3 air interface at rates ranging from 106 to 424 kbit/s. Other radio frequency bands are contemplated as well. For example, other NFC standards. In this regard, NFC standards may cover various communications protocols and data exchange formats. The NFC standards may be based on existing radio-frequency identification (RFID) standards including ISO/IEC 14443, FeliCa, and/or the like. The NFC standards may include ISO/IEC 18092, those defined by the NFC Forum, and/or the like. In addition or alternatively, the NFC device 130 may utilize a GSMA group defined platform for the deployment of GSMA NFC Standards for the wireless device 104, the NFC device 130, the NFC target 140, and/or the like.

The wireless device 104 may include a camera 138 that is multifunctional. In one aspect, the camera 138 may be a triggering component for triggering operation of the transition application 155. In one aspect, the camera 138 may be a triggering component for triggering operation of the transition application 155 in response to capturing an image of a machine-readable code such as a QR code, a Data Matrix (DM) code, a Universal Product Code (UPC), and/or the like. In this regard, the wireless device 104 operating the camera 138 may capture a machine readable code that initiates the transition application 155. In one aspect, the wireless device 104 operating the camera 138 may capture a machine readable code that initiates download and/or installation of the transition application 155.

The camera 138 may be used to capture images such as of a person or place, biometric readings such as a fingerprint or a retina, letters, symbols, and numbers (optical character reading/machine code reading), an image of a machine code, which may include a bar code such as a QR code, a Data Matrix (DM) code, a Universal Product Code (UPC), and/or the like. The camera 138 may be on the front, back, sides and/or the like of the wireless device 104.

The camera 138 may include a charge coupled device (CCD), CMOS image sensors, Back Side Illuminated CMOS, or the like. Images captured by the camera 138 may be converted and stored in various formats including a JPEG file format, RAW feature format such as the Android (operating system) 5.0 Lollipop, and/or the like.

In a particular aspect, the camera 138 may include functionality as a barcode reader, a Data Matrix code reader, a QR code reader, or the like. A QR code (Quick Response Code) is a type of matrix barcode (or two-dimensional barcode). The matrix barcode may be a machine-readable optical label that contains information about the item to which it is attached. A QR code uses a number of standardized encoding modes including numeric, alphanumeric, byte/binary, and/or the like to efficiently store data. The QR code may include black modules arranged in a square grid on a white background, which can be read by the camera 138 or other imaging device and processed using Reed-Solomon error correction until the image can be appropriately interpreted. The required data may then extracted from patterns that are present in both horizontal and vertical components of the image.

In a particular aspect, the camera 138 may include functionality as a Data Matrix code reader. A Data Matrix code is a two-dimensional matrix barcode (machine-readable) including black and white "cells" or modules arranged in either a square or rectangular pattern. The Data Matrix code may be implemented with the ECC 200 version of Data Matrix and include Reed-Solomon codes for error and erasure recovery. Other protocols and/or versions of Data Matrix are contemplated as well.

In a particular aspect, the camera 138 may include functionality as a Universal Product Code (UPC) reader. The UPC is a barcode symbology utilizing protocols such as UPC-A, UPC-E, EAN, UPC-B, UPC-C UPC-D, UPC-2, UPC-5 and/or the like type machine-readable codes.

The camera 138 can be in communication with the processor 114, the memory 116, and the user interface 122. Moreover, the camera 138 may be in direct communication with an analog to digital converter. Accordingly, the camera 138 may capture the machine readable code, such as the bar code, the QR code, the Data Matrix, or the like and generate an analog signal. The analog signal may be converted to a digital signal for processing by the processor 114. The processor 114 may be a central processing unit configured to execute instructions such as instructions related to software programs. In one aspect, the camera 138 capturing a particular machine readable code may be a triggering component for triggering operation of the transition application 155.

The memory 116 of the wireless device 104 may further include an operating system 148, a communication component 150, a contact/motion component 152, a graphics component 154, and/or the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM 162, UICC, cloud-based memory, flash memory or the like. These various components may be connected through various communication lines including a data bus 170.

In one aspect, the SIM 162 may be a triggering component for triggering operation of the transition application 155. In one aspect, the SIM 162 initiates download and/or installation of the transition application 155. In one aspect, the SIM 162 stores the transition application 155. In one aspect, the SIM 162 stores a flag or other indicator indicating that the transition application 155 should be implemented by the wireless device 104.

Figure 8:
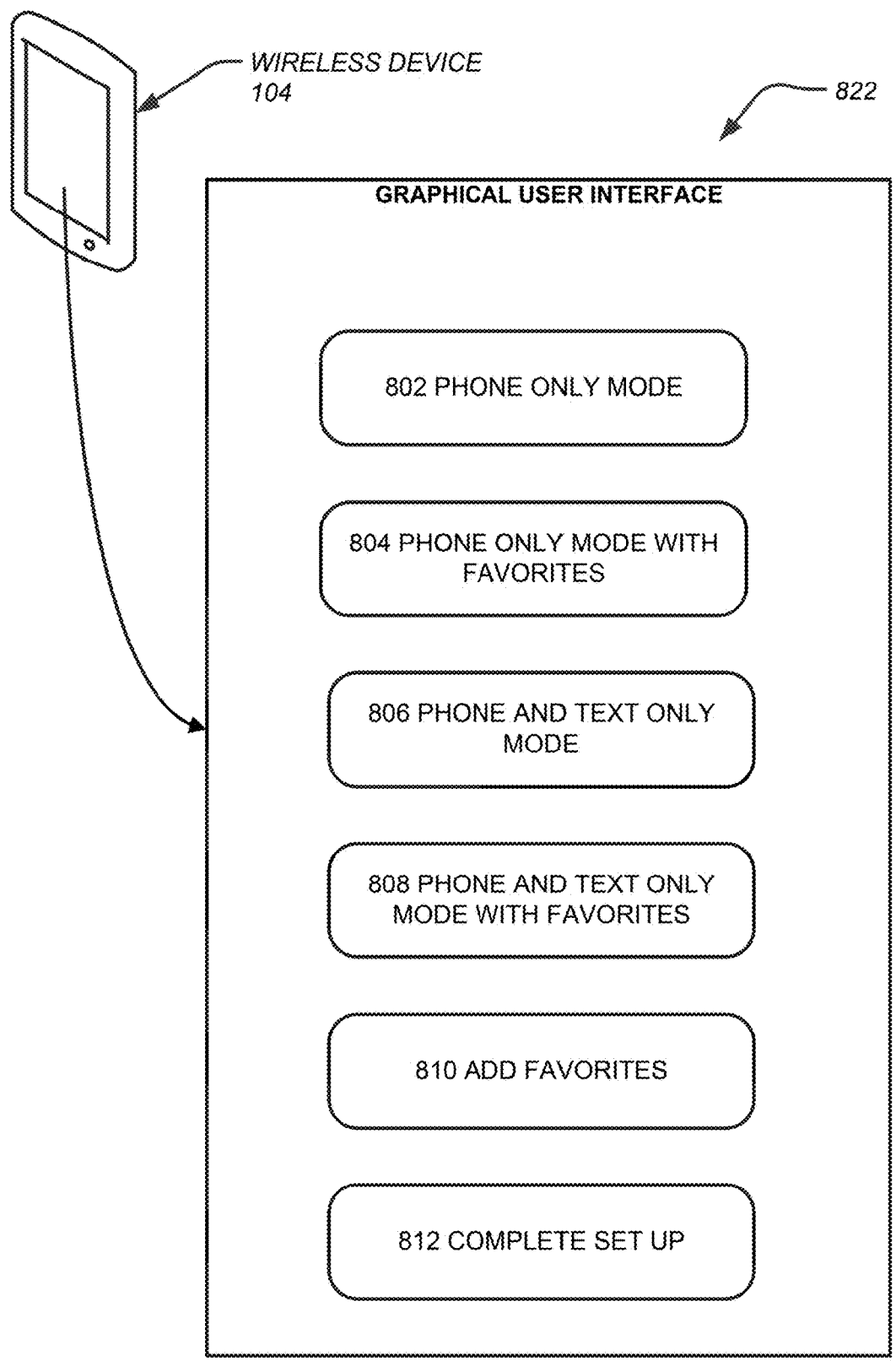
FIG. 8 illustrates an exemplary set up graphical user interface in accordance with aspects of the disclosure.

In further aspects, the transition application 155 may be configured and implemented to operate based on a setup operation initiated once the transition application 155 has been executed by the processor 114 the first time. The setup operation is illustrated in FIG. 8.

The display 118 may be a liquid crystal display (LCD), light-emitting diode (LED) display, or the like. The display 118 may include a backlight to illuminate the various color liquid crystals to provide a more colorful display. The user interface 122 may be any type of physical input as readily employed in the field. For example, the user interface 122 may have physical buttons. Alternatively, the user interface 122 may be implemented on a touchscreen 180, a motion sensor (not shown), and/or the like. Finally, the wireless device 104 may include a power supply 158.

The wireless device 104 can include an audio input/output device 156. The audio input/output device 156 may include speakers, speaker outputs, and/or the like, providing sound output; and may include microphones, microphone inputs, and/or the like, for receiving sound inputs. In an exemplary aspect, the audio input/output device 156 may include an analog to digital converter and a digital to audio converter for audio input and output functions respectively.

The transceiver 120 and/or the processor 114 may provide radio and signal processing as needed to access a wireless network for services. The transceiver 120 and/or the processor 114 may be configured to process call functions, data transfer, and/or the like and provide an array of services, based on those functions, to the user.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. Additionally, the wireless device 104 may further include a touch screen controller 160.

In one operation, the display 118 may show various ones of the objects 190 associated with applications (icons) for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover, the display 118 may include a plurality of screens. The display 118 showing one screen at a time. The user may interact with the display 118 to move a screen into view on the display 118. Various ones of the objects 190 may be located in each of the screens.

In one aspect, the transition application 155 implementing basic features may prevent display of the plurality of objects 190, the menu of options, and/or the like. In one aspect, the transition application 155 implementing basic features may prevent operation of the plurality of objects 190, the menu of options, and/or the like. In one aspect, the transition application 155 implementing basic features may prevent display and operation of the plurality of objects 190, the menu of options, and/or the like. In one aspect, the transition application 155 implementing basic features may prevent interaction with the plurality of objects 190, the menu of options, and/or the like.

The touchscreen 180 may be implemented as a resistive touchscreen, a surface acoustic wave touch screen, a capacitive touchscreen, self-capacitance sensors, infrared sensors, dispersive signal technology, acoustic pulse recognition, and/or the like.

The display 118 is generally configured to display a user interface 122 or graphical user interface (GUI) that provides an easy to use visual interface between a user of the wireless device 104 and the operating system or application(s) running on the wireless device 104. Generally, the GUI presents programs, files, and operational options with graphical images. During operation, the user may select and activate various graphical images displayed on the display 118 in order to initiate functions and tasks associated therewith.

In another aspect of the disclosure, the memory 116 of the wireless device 104 can include a database for storing user information. The user information may include information such as full name, address, email address, contact number, credit card information, and/or the like. In one aspect, the database may include security questions. In another aspect, the database may include user specified preferences.

With reference to FIG. 2, FIG. 3, FIG. 4, FIG. 5, FIG. 6, and FIG. 7, these Figures illustrate various graphical user interfaces implemented by the transition application 155. In this regard, the transition application 155 may configure the graphical user interfaces to use one or multiple ones of the graphical user interfaces based on the setting, the triggering component, the set up operation, and/or the like. For example, a first setting, a first triggering component, and/or a first set up operation may only implement the graphical user interface 222 associated with FIG. 2. Alternatively, a second setting, a second triggering component, and/or a second set up operation may implement the graphical user interface 322 associated with FIG. 3 with the FIG. 2 graphical user interface 222 being implemented in response to operation of the graphical user interface 322 of FIG. 3. Numerous other combinations are contemplated as well and are within the spirit and scope of the disclosure.

Figure 2:
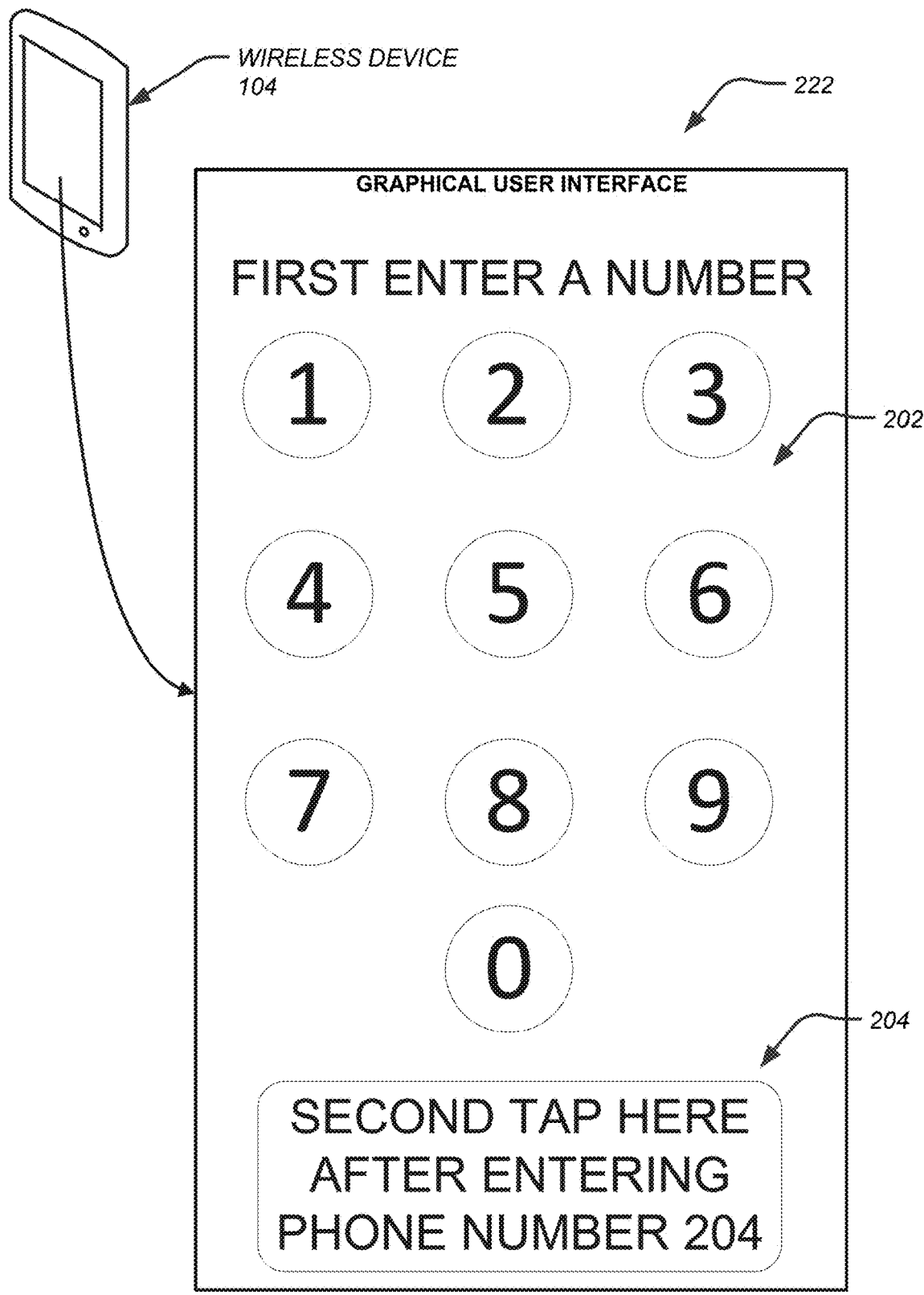
FIG. 2 illustrates an exemplary graphical user interface in accordance with aspects of the disclosure.

FIG. 2 illustrates an exemplary graphical user interface in accordance with aspects of the disclosure.

In particular, FIG. 2 illustrates a graphical user interface 222 generated by the transition application 155 when implementing basic features. In particular, the graphical user interface 222 may be configured to provide limited functionality and interaction with the wireless device 104. In this regard, the graphical user interface 222 only generates a phone keypad 202 together with a call button 204. In particular aspects, the phone keypad 202 and the call button 204 may be implemented with very large text in order to help a user see and utilize the phone keypad 202 and operate the wireless device 104. In particular aspects, the graphical user interface 222 may include detailed instructions on placing a call. For example, the graphical user interface 222 may be implemented with very large text with instructions such as "FIRST ENTER A NUMBER" and "SECOND TAP HERE AFTER ENTERING A PHONE NUMBER" associated with the call button 204. However, the particular text illustrated in the Figures and disclosed herein is merely exemplary. Moreover, the wireless device 104 and/or the transition application 155 may be configured to generate any text as described herein consistent with a desired language. As illustrated in FIG. 2, the graphical user interface 222 provides only phone calling capability thus providing an increased ease of use needed and/or desired by many individuals. In one aspect, the wireless device 104 implementing the transition application 155 may only generate the graphical user interface 222. In one aspect, when the wireless device 104 is powered and awakened, only the graphical user interface 222 may be shown. In one aspect, the wireless device 104 implementing the transition application 155 may generate the graphical user interface 222 in response to another graphical user interface such as the graphical user interface 322 illustrated in FIG. 3.

Figure 3:
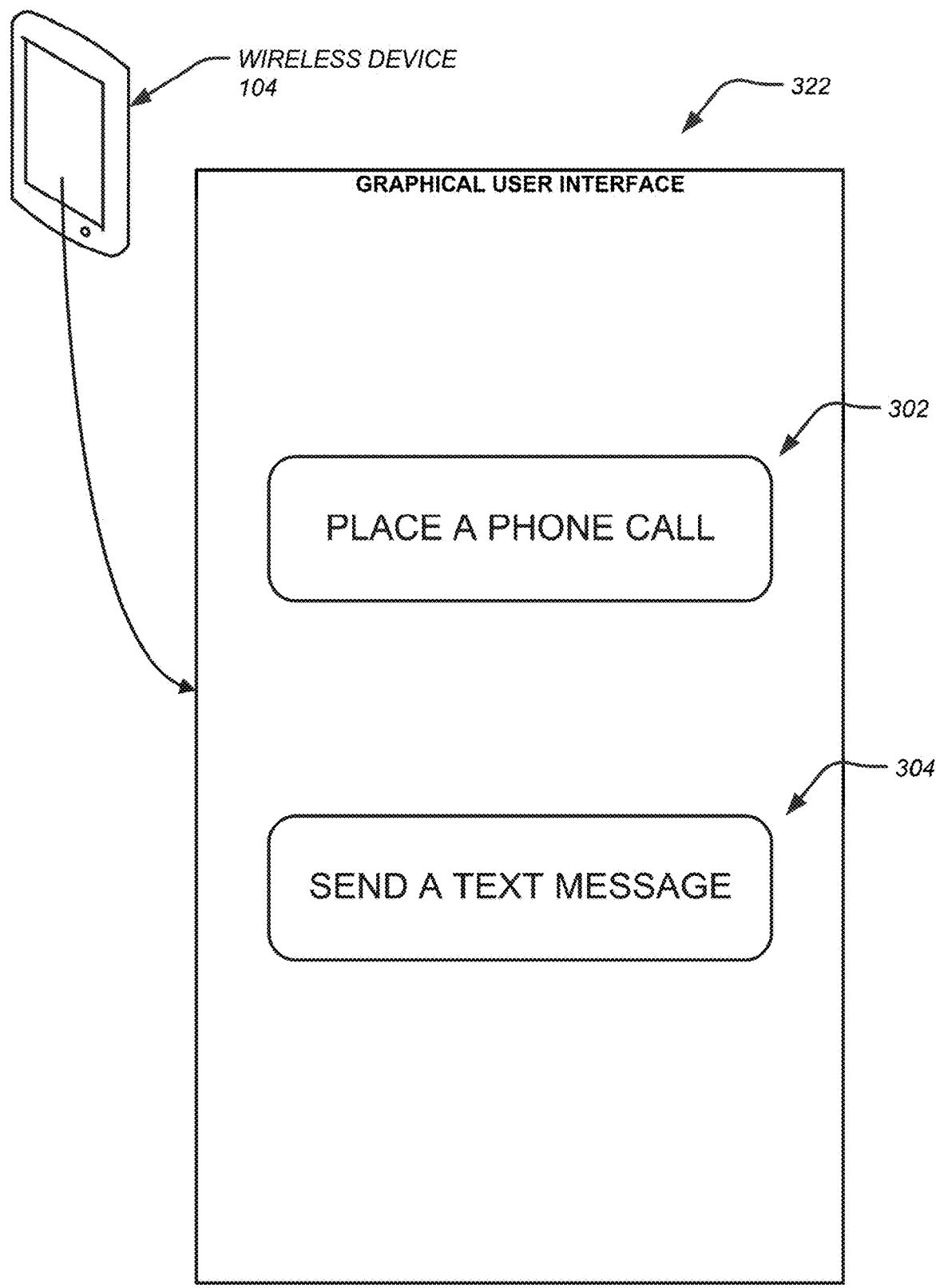
FIG. 3 illustrates an exemplary graphical user interface in accordance with aspects of the disclosure.

FIG. 3 illustrates an exemplary graphical user interface in accordance with aspects of the disclosure.

In particular, FIG. 3 illustrates a graphical user interface 322 that may be generated by the transition application 155 when implementing basic features. In particular, the graphical user interface 322 may be configured to provide limited functionality and interaction with the wireless device 104. In this regard, the graphical user interface 322 only generates a limited number of virtual touch sensitive buttons. In one aspect, the graphical user interface 322 may only generate a PLACE A PHONE CALL button 302 and a SEND A TEXT MESSAGE button 304. However, the particular text illustrated in the Figures and disclosed herein is merely exemplary. In particular aspects, the virtual touch sensitive buttons may be implemented with very large text in order to help a user see and utilize the virtual touch sensitive buttons.

In one aspect, when the wireless device 104 is powered and awakened, only the graphical user interface 322 may be shown. In one aspect, a user selecting the PLACE A PHONE CALL button 302 may initiate display of the graphical user interface 222 illustrated in FIG. 2. In one aspect, a user selecting the SEND A TEXT MESSAGE button 304 may initiate display of the graphical user interface 222 illustrated in FIG. 2 followed by the graphical user interface 722 illustrated in FIG. 7.

Figure 4:
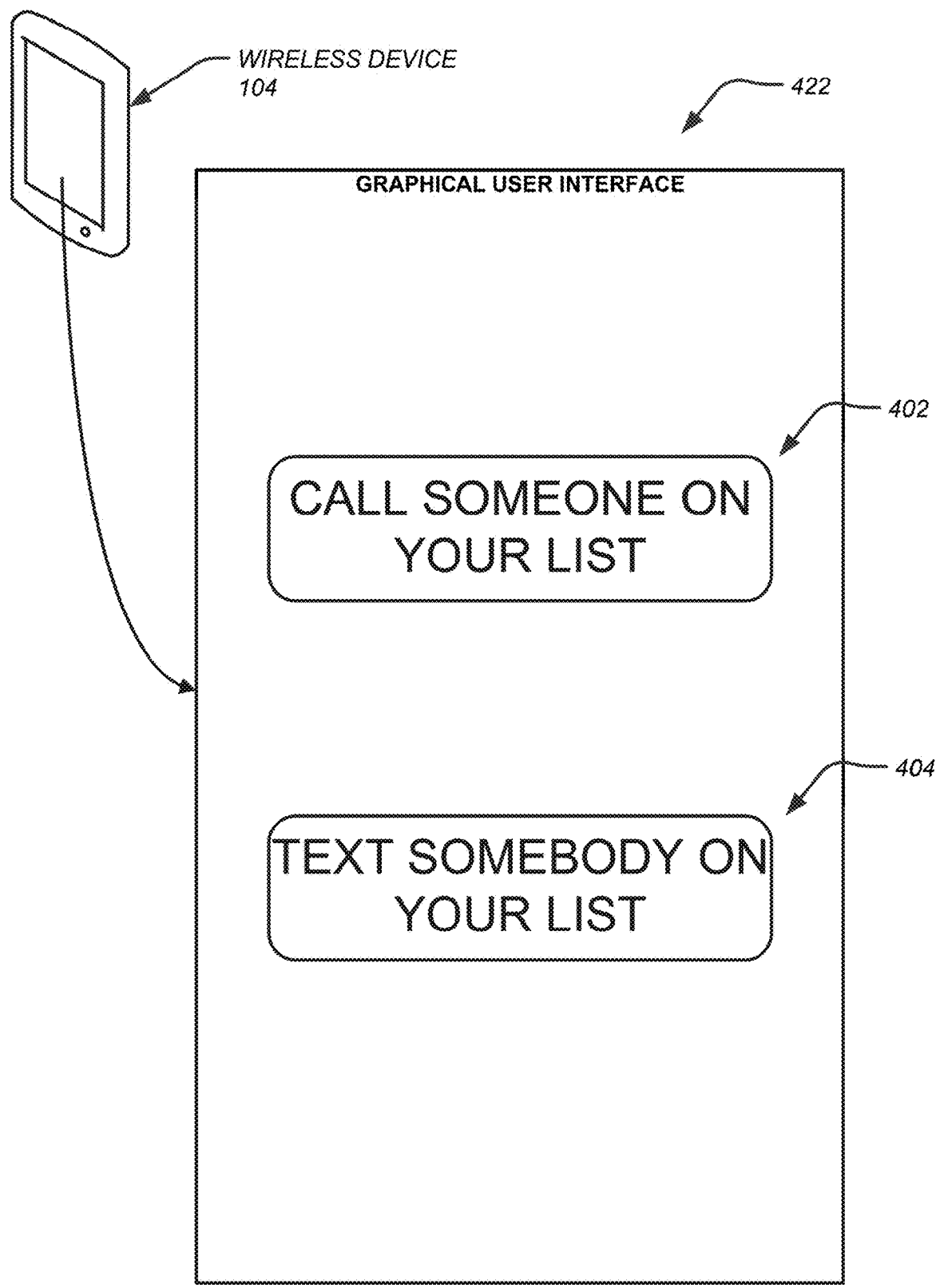
FIG. 4 illustrates an exemplary graphical user interface in accordance with aspects of the disclosure.

FIG. 4 illustrates an exemplary graphical user interface in accordance with aspects of the disclosure.

In particular, FIG. 4 illustrates a graphical user interface 422 generated by the transition application 155 when implementing basic features. In particular, the graphical user interface 422 may be configured to provide limited functionality and interaction with the wireless device 104. In this regard, the graphical user interface 422 only generates a limited number of virtual touch sensitive buttons. In one aspect, the graphical user interface 422 may only generate a CALL SOMEONE ON YOUR LIST button 402 and a TEXT SOMEBODY ON YOUR LIST button 404. However, the particular text illustrated in the Figures and disclosed herein is merely exemplary. In particular aspects, the virtual touch sensitive buttons may be implemented with very large text in order to help a user see and utilize the virtual touch sensitive buttons.

In one aspect, when the wireless device 104 is powered and awakened, only the graphical user interface 422 may be shown. In one aspect, a user selecting the CALL SOMEONE ON YOUR LIST button 402 may initiate display of the graphical user interface 522 illustrated in FIG. 5.

In one aspect, when the wireless device 104 is powered and awakened, only the graphical user interface 422 may be shown. In one aspect, a user selecting the TEXT SOMEBODY ON YOUR LIST button 404 may initiate display of the graphical user interface 722 illustrated in FIG. 7.

Figure 5:
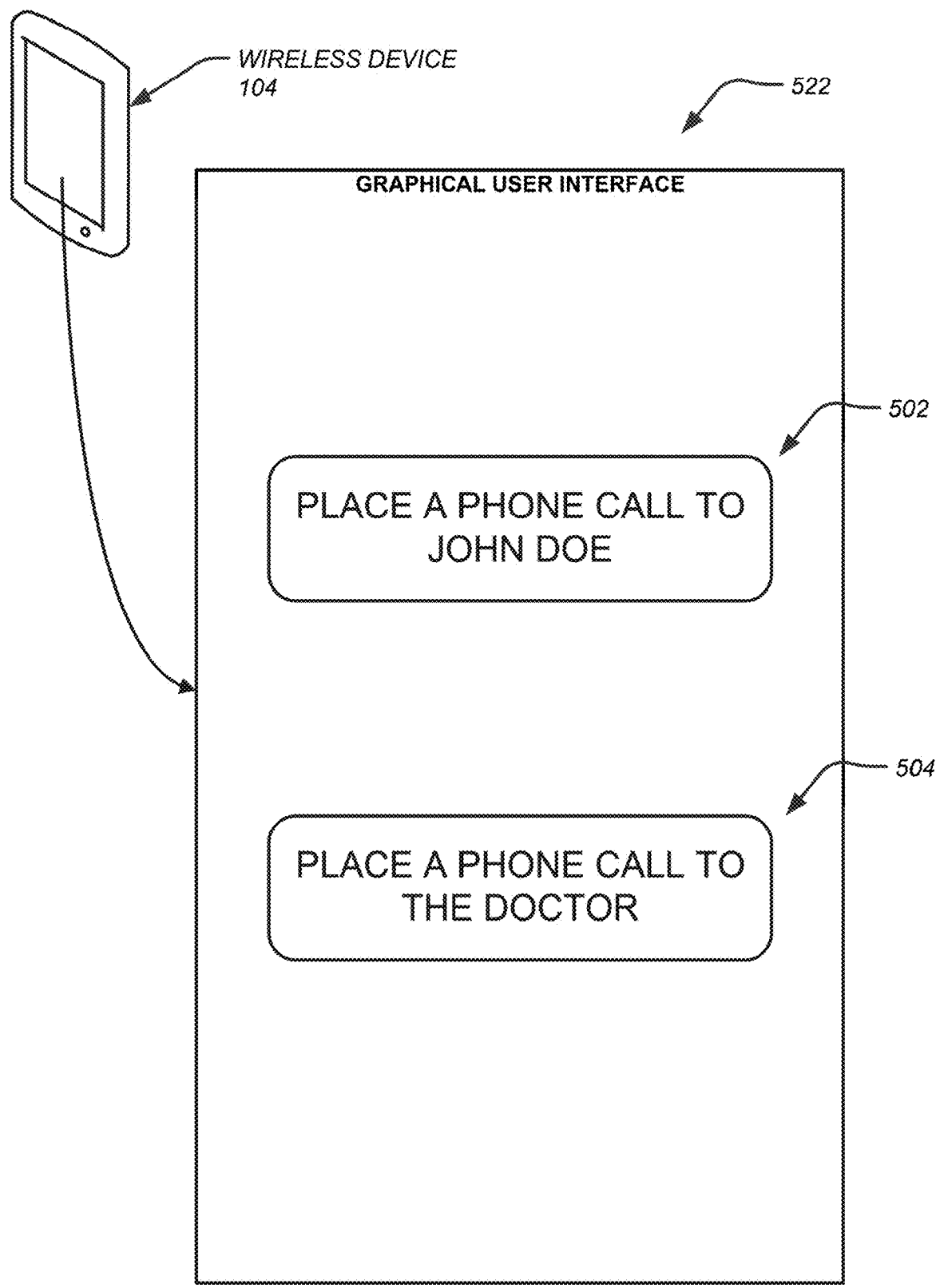
FIG. 5 illustrates an exemplary graphical user interface in accordance with aspects of the disclosure.

FIG. 5 illustrates an exemplary graphical user interface in accordance with aspects of the disclosure.

In particular, FIG. 5 illustrates a graphical user interface 522 generated by the transition application 155 when implementing basic features. In particular, the graphical user interface 522 may be configured to provide limited functionality and interaction with the wireless device 104. In this regard, the graphical user interface 522 only generates a limited number of virtual touch sensitive buttons. In one aspect, the graphical user interface 422 may only generate one or more virtual touch sensitive buttons that may immediately call an individual or entity associated with the virtual touch sensitive button. In the example shown in FIG. 5, a virtual button 502 has been assigned to one individual; and a virtual button 504 has been assigned to call a particular entity. In this regard, tapping the virtual button 502 will initiate a phone call to that particular individual; and tapping the virtual button 504 will initiate a phone call to that particular entity. The manner in which the buttons are assigned is further described with reference to FIG. 8 and FIG. 10. In particular aspects, the virtual touch sensitive buttons may be implemented with very large text in order to help a user see and utilize the virtual touch sensitive buttons.

Figure 6:
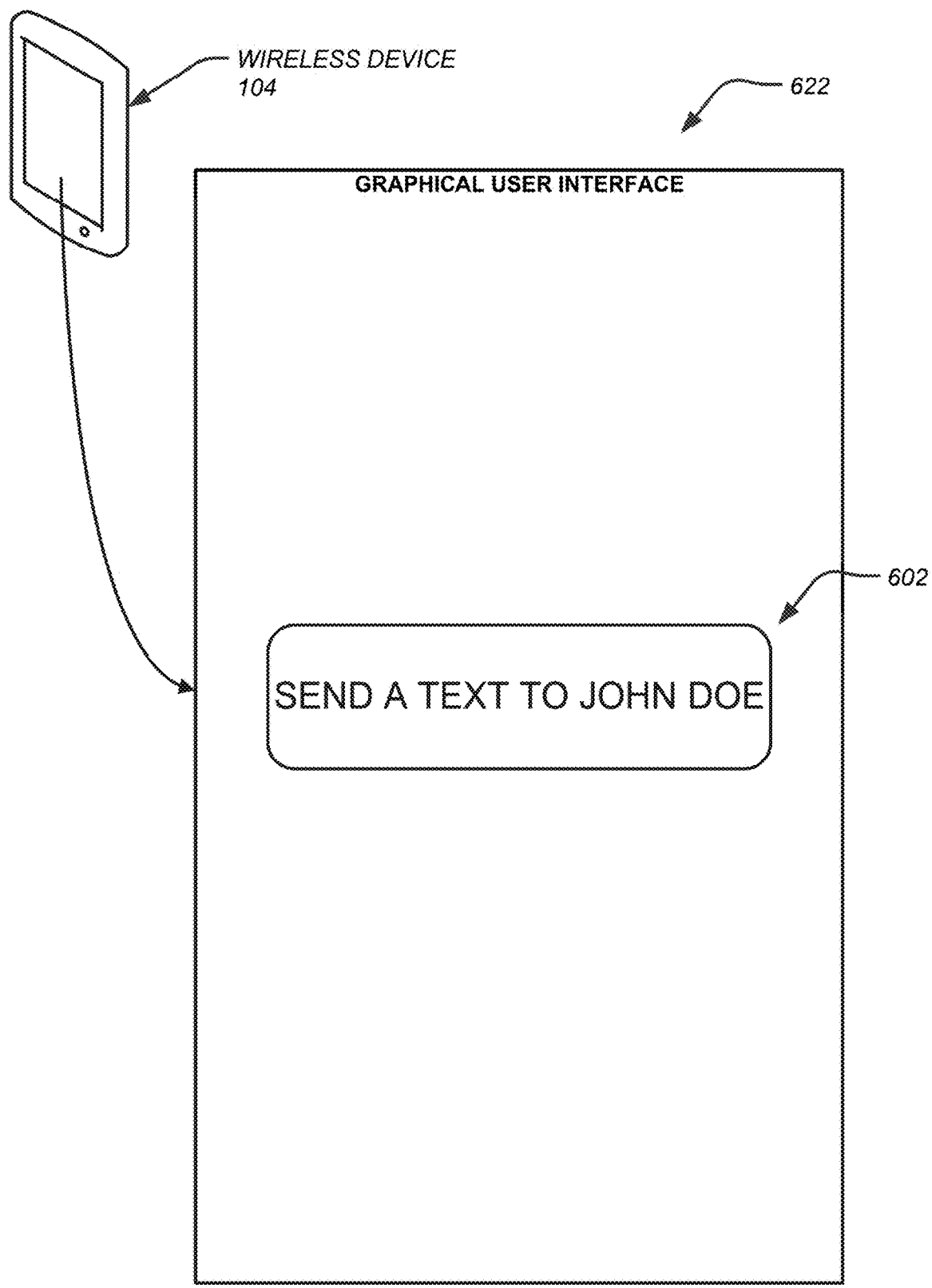
FIG. 6 illustrates an exemplary graphical user interface in accordance with aspects of the disclosure.

FIG. 6 illustrates an exemplary graphical user interface in accordance with aspects of the disclosure.

In particular, FIG. 6 illustrates a graphical user interface 622 generated by the transition application 155 when implementing basic features. In particular, the graphical user interface 622 may be configured to provide limited functionality and interaction with the wireless device 104. In this regard, the graphical user interface 622 only generates a limited number of virtual touch sensitive buttons. In one aspect, the graphical user interface 622 may only generate one or more virtual touch sensitive buttons that may initiate a text to an individual or entity associated with the virtual touch sensitive button. In the example shown in FIG. 6, a virtual button 602 has been assigned to one individual. In this regard, tapping the virtual button 602 will initiate a text to that particular individual. Thereafter, the wireless device 104 may generate the graphical user interface 722 in order to compose and send the text message associated with the individual associated with the virtual button 602.

The manner in which the buttons are assigned is further described with reference to FIG. 8 and FIG. 10. In particular aspects, the virtual touch sensitive buttons may be implemented with very large text in order to help a user see and utilize the virtual touch sensitive buttons.

Figure 7:
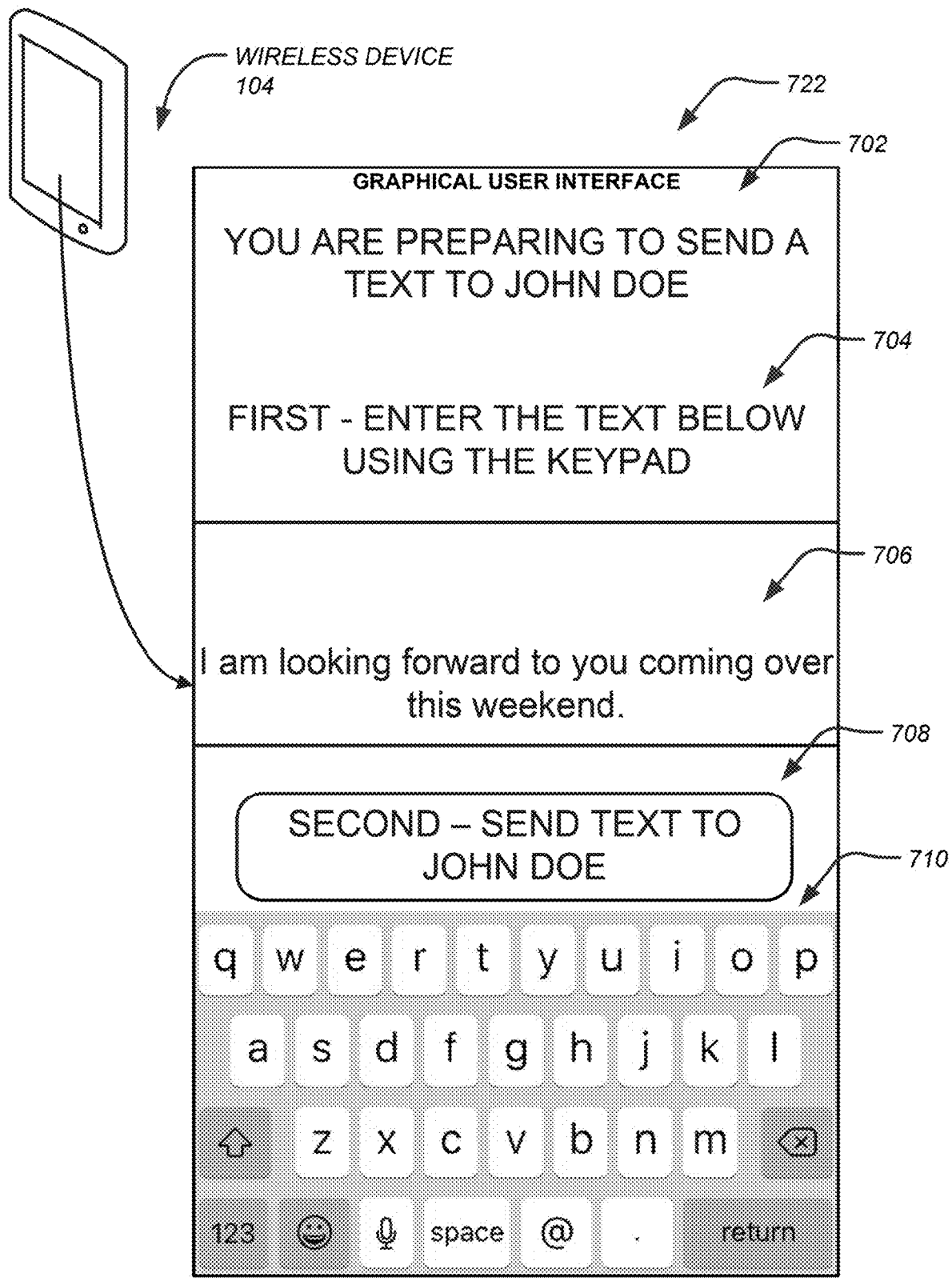
FIG. 7 illustrates an exemplary graphical user interface in accordance with aspects of the disclosure.

FIG. 7 illustrates an exemplary graphical user interface in accordance with aspects of the disclosure.

In particular, FIG. 7 illustrates a graphical user interface 722 generated by the transition application 155 when implementing basic features. In particular, the graphical user interface 722 may be configured to provide limited functionality and interaction with the wireless device 104.

In this regard, the graphical user interface 722 generates detailed instructions for operation. In one aspect, the graphical user interface 722 may indicate that YOU ARE PREPARING TO SEND A TEXT TO . . . a particular individual 702. In one aspect, the graphical user interface 722 may indicate that FIRST—ENTER THE TEXT BELOW USING THE KEYPAD 704. In one aspect, the graphical user interface 722 may indicate that SECOND—SEND TEXT TO . . . a particular individual 708. These instructions are exemplary and can be implemented using different terminology. This level of detailed instructions ensures that a less savvy user understands the process and can step through the process more easily to send a text message. Finally, the graphical user interface 722 may include a text entry section 706 and a virtual keypad 710 to compose and send the text message.

FIG. 8 illustrates an exemplary set up graphical user interface in accordance with aspects of the disclosure.

In particular, FIG. 8 illustrates a graphical user interface 822 generated by the transition application 155. In particular, the graphical user interface 822 may be configured to set up limited functionality and interaction with the wireless device 104.

It is contemplated that the graphical user interface 822 illustrated in FIG. 8 may be provided at the time of setting up the wireless device 104 and may be operated by a parent, caregiver, wireless salesperson, or the like as operation of the graphical user interface 822 may be beyond the skill set of the wireless user.

In one aspect, the graphical user interface 822 may provide virtual touch sensitive buttons to setup the wireless device 104 to implement the transition application 155 to provide the following functionality and/or modes of operation: phone only mode 802, phone only mode with favorites mode 804, phone and text only mode 806, and phone and text only mode with favorites 808. Other modes with varying features form part of the disclosure and are contemplated as well.

In one aspect, the graphical user interface 822 may receive a selection of the virtual touch sensitive button associated with phone only mode 802. Subsequently, the transition application 155 may operate to provide the functionality of the graphical user interface 222 described above with respect to FIG. 2 only.

In one aspect, the graphical user interface 822 may receive a selection of the virtual touch sensitive button associated with phone only mode with favorites mode 804. Subsequently, the transition application 155 may operate to provide the functionality described above with respect to FIG. 5.

In one aspect, the graphical user interface 822 may receive a selection of the virtual touch sensitive button associated with phone and text only mode 806. Subsequently, the transition application 155 may operate to provide the functionality described above with respect to FIG. 1, FIG. 3, and FIG. 7.

In one aspect, the graphical user interface 822 may receive a selection of the virtual touch sensitive button associated with phone and text only mode with favorites 808. Subsequently, the transition application 155 may operate to provide the functionality described above with respect to FIG. 4, FIG. 5, and FIG. 7.

In one aspect, the graphical user interface 822 may receive a selection of the virtual touch sensitive button associated with an add favorites virtual touch sensitive button 810. In this regard, the user can enter the names and phone numbers of favorites to be associated by the transition application 155 to be listed as favorites in the various graphical user interfaces including one or more of the graphical user interfaces illustrated in FIG. 5 and FIG. 6.

In one aspect, the graphical user interface 822 may receive a selection of the virtual touch sensitive button to complete a setup 812 of the transition application 155. In this regard, the transition application 155 receiving input as described above may be stored in the memory 116 of the wireless device 104 in order to operate the transition application 155 with the desired features FIG. 9 illustrates various implementations of he wireless device in accordance with aspects of the disclosure.

Figure 9:
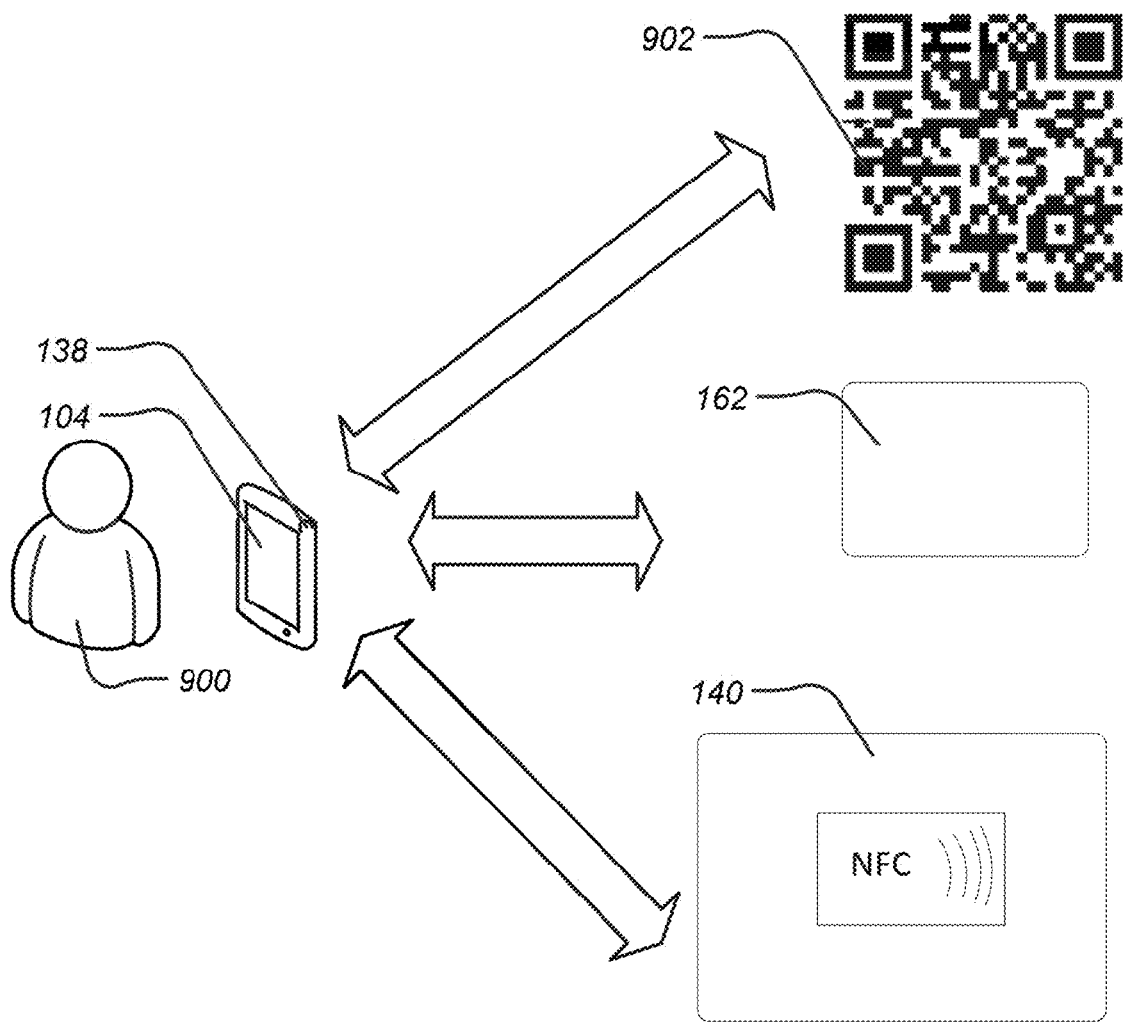
FIG. 9 illustrates various implementations of he wireless device in accordance with aspects of the disclosure.

In particular, FIG. 9 illustrates various implementations of the wireless device 104 as it relates to a triggering component that may be utilized to initiate operation of the transition application 155. In one aspect, the triggering component may be the NFC device 130 operating in response to the NFC target 140, the camera 138 operating in response to a machine-readable code 902, a SIM 162, and/or the like.

In one aspect, the triggering component may be the NFC device 130. In one aspect, the NFC device 130 may be a triggering component for triggering operation of the transition application 155. In one aspect, the NFC device 130 may be a triggering component for triggering operation of the transition application 155 in response to exchanging data with the NFC target 140. In one aspect, the NFC target 140 may be a passive target. In one aspect, the NFC target 140 may include form factors such as unpowered tags, stickers, key fobs, cards, and/or the like. In one aspect, the NFC target 140 may include a cue card form factor. In this aspect, the cue card form factor may include printed instructions for implementation of the NFC target 140 cue card form factor. In an alternative to this aspect, the cue card form factor may include a QR code that is readable with a wireless device for launching a browser that points to a website providing instructions for implementation of the NFC target 140 cue card form factor.

In a particular aspect, the NFC target 140 may be located in proximity to the wireless device 104. In a particular aspect, the NFC target 140 may have a sticker form factor that may be located in proximity to the wireless device 104. For example, the NFC target 140 may be located inside the wireless device 104. Thereafter, the wireless device 104 may sense the NFC target 140 with the NFC device 130 to implement the transition application 155 and thereafter operate the wireless device 104 as a wireless device 104 having basic features as defined herein. This particular aspect may have numerous benefits as it is a simple implementation to apply a sticker based form factor of the NFC target 140 to the wireless device 104 to reconfigure the graphical user interface to implement the basic features. Likewise, when the user decides to reconfigure the wireless device 104 to operate as a standard smart phone, the sticker based form factor of the NFC target 140 may be easily removed. In a particular aspect, the NFC target 140 may have a cue card form factor that may be located in proximity to the wireless device 104. For example, the NFC target 140 may be tapped on the wireless device 104 to launch the transition application 155. Thereafter, the wireless device 104 may sense the NFC target 140 with the NFC device 130 to implement the transition application 155 and thereafter operate the wireless device 104 as a wireless device 104 having basic features as defined herein.

In further aspects, the user 900 may be able to choose one of a plurality of NFC targets 140. Each of the NFC targets 140 may provide one of phone only mode 802, phone only mode with favorites mode 804, phone and text only mode 806, phone and text only mode with favorites 808, or the like. In other words, one NFC target 140 may provide phone only mode 802. This NFC target 140 may be arranged with the wireless device 104. Thereafter, the wireless device 104 may operate in response to the transition application 155 to provide phone only mode 802 as described above with respect to FIG. 1 only. In this regard, a user 900 may select the desired NFC target 140 to provide the desired mode of operation by the transition application 155. Accordingly, the other NFC targets 140 selected by the user 900 may provide the appropriate mode of operation as desired as described herein.

In one aspect, the triggering component may be the camera 138. In one aspect, the camera 138 may be a triggering component for triggering operation of the transition application 155. In one aspect, the camera 138 may be a triggering component for triggering operation of the transition application 155 in response to capturing an image of a machine-readable code 902.

In a particular aspect, the machine-readable code 902 may be captured by the camera 138 of the wireless device 104. Thereafter, the wireless device 104 may capture the machine-readable code 902 with the camera 138 to download, install, and/or implement the transition application 155 and thereafter operate the wireless device 104 as a wireless device 104 having basic features as defined herein.

In further aspects, the user 900 may be able to choose one of a plurality of machine-readable codes 902. Each of the machine-readable codes 902 may provide one of phone only mode 802, phone only mode with favorites mode 804, phone and text only mode 806, phone and text only mode with favorites 808, or the like. In other words, one machine-readable code 902 may provide phone only mode 802. Thereafter, the wireless device 104 may operate in response to the transition application 155 to provide phone only mode 802 as described above with respect to FIG. 1 only. In this regard, a user may capture an image of the desired machine-readable code 902 to provide the desired mode of operation by the transition application 155. Accordingly, the other machine-readable codes 902 captured by the user 900 may provide the appropriate mode of operation as desired as described herein.

In one aspect, the triggering component may be the SIM 162. In one aspect, the SIM 162 may be a triggering component for triggering operation of the transition application 155.

In a particular aspect, the processor 114 may query the SIM 162 of the wireless device 104. Thereafter, the wireless device 104 may download, install, and/or implement the transition application 155 and thereafter operate the wireless device 104 as a wireless device 104 having basic features as defined herein.

In further aspects, the user 900 may be able to choose one of a plurality of SIMs 162. Each of the SIMs 162 may provide one of phone only mode 802, phone only mode with favorites mode 804, phone and text only mode 806, phone and text only mode with favorites 808, or the like. In other words, one SIM 162 may provide phone only mode 802. Thereafter, the wireless device 104 may operate in response to the transition application 155 to provide phone only mode 802 as described above with respect to FIG. 1 only. In this regard, a user may install the desired SIM 162 to provide the desired mode of operation by the transition application 155. Accordingly, the other SIMs 162 may provide the appropriate mode of operation as desired as described herein.

Figure 10:
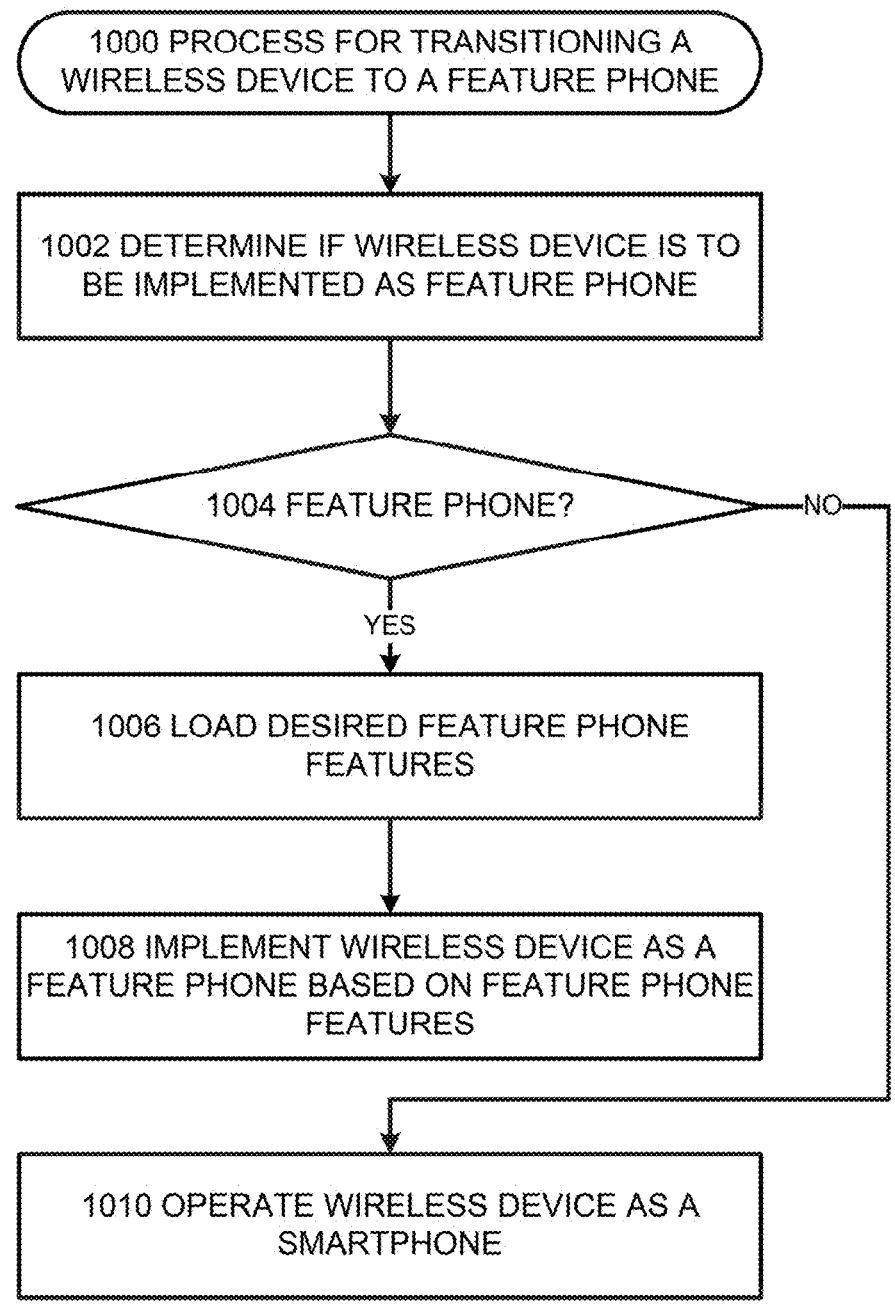
FIG. 10 illustrates an exemplary process that may be used to implement the system of the disclosure.

FIG. 10 illustrates an exemplary process that may be used to implement the system of the disclosure.

In particular, FIG. 10 illustrates a process for transitioning a wireless device to a feature phone 1000. The process for transitioning a wireless device to a feature phone 1000 may be implemented at least in part by the transition application 155 executed by the processor 114 to provide the basic features as described herein.

In box 1002, the process for transitioning a wireless device to a feature phone 1000 may determine if wireless device is to be implemented as feature phone and/or a wireless device 104 implementing basic features as described herein. In this regard, the process of box 1002 may be implemented by a triggering component such as the NFC device 130 responsive to the NFC target 140, the camera 138 operating in response to a machine-readable code 902, a SIM 162, and/or the like. Alternatively, box 1002 may determine that the wireless device 104 is to be implemented as a feature phone based on a flag set in the memory 116, a previous implementation of the transition application 155, a setting in the transition application 155, and/or the like.

In box 1004, the processor 114 implementing the transition application 155 may determine whether the wireless device 104 is to be implemented as a feature phone and/or a wireless device implementing basic features. The determination being based on box 1002. If in box 1004 the wireless device 104 is to be implemented as a feature phone and/or a wireless device implementing basic features, the logic of the process for transitioning a wireless device to a feature phone 1000 may advance to box 1006. On the other hand, if in box 1004 the wireless device 104 is not to be implemented as a feature phone and/or a wireless device implementing basic features, the logic of the process for transitioning a wireless device to a feature phone 1000 may advance to box 1010.

In box 1006 of the process for transitioning a wireless device to a feature phone 1000, the desired feature phone features may be loaded into the wireless device 104 in response to the transition application 155. The features may be associated with one of phone only mode 802, phone only mode with favorites mode 804, phone and text only mode 806, phone and text only mode with favorites 808, or the like.

In box 1008 of the process for transitioning a wireless device to a feature phone 1000, the transition application 155 may implement the wireless device 104 as a feature phone and/or with basic features that include one of phone only mode 802, phone only mode with favorites mode 804, phone and text only mode 806, phone and text only mode with favorites 808, or the like.

In box 1010 of the process for transitioning a wireless device to a feature phone 1000, the transition application 155 may operate the wireless device 104 as a smartphone with all of the standard features and functionalities of a smartphone.

In one aspect, the process for transitioning a wireless device to a feature phone 1000 may be implemented each time the phone is powered up. In this regard, a user 900 may decide to use all of the smartphone functionality of the wireless device 104 and accordingly remove the triggering component, such as the NFC target 140. Thereafter, the wireless device 104 may be implemented as a smartphone. Additionally, if the triggering application 155 has been previously set up or a flag has been set in memory to operate the wireless device 104 as a feature phone and/or a phone having basic features, the wireless device 104 may display a prompt to receive confirmation from the user 900 that the wireless device 104 should be implemented as a smartphone.

Accordingly, the disclosure has provided a device and process that solves the challenges of using a smart phone by certain segments of the population. Moreover, the disclosure has provided a device and process that reduces the cost and complexity of maintaining an inventory of phones and the cost of ensuring network compatibility of such phones.

The term text messaging service, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, and 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While a popular use is to send photographs from camera-equipped handsets, it is also used as a method of delivering news and entertainment content including videos, pictures, text pages, and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term voice call service, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), 5G (fifth generation), W-CDMA (Wideband Code-Division Multiple Access), Wireless Fidelity (Wi-Fi), Bluetooth, Near field communication (NFC), and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The disclosure may be implemented in any type of computing devices, such as, e.g., a desktop computer, personal computer, a laptop/mobile computer, a personal data assistant (PDA), a mobile phone, a tablet computer, cloud computing device, and/or the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A wireless device configured to operate both as a smart phone and a phone having basic features comprising:
    a memory configured to store a transition application;
    a processor configured to implement the transition application in response to a triggering component;
    a display configured to display a graphical user interface for controlling operation of the processor and the wireless device;
    the processor further configured to implement the transition application in response to a triggering component to load basic features into the wireless device to modify operation of the wireless device to implement the basic features including to reconfigure the graphical user interface displayed by the display to implement the basic features;
    the processor is further configured to implement the transition application in response to the triggering component to generate a graphical user interface configured to receive a selection of a mode of operation of the basic features; and
    the processor is further configured to implement the transition application to implement the selection of the mode of operation of the basic features,
    wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons; and
wherein the triggering component comprises at least one of the following: an NFC device operating in response to an NFC target, a camera device operating in response to a machine-readable code, and a SIM card.

2. The wireless device of claim 1, wherein the triggering component comprises the NFC device operating in response to the NFC target;
the processor further configured to implement the transition application in response to the triggering component to reconfigure the graphical user interface displayed by the display to implement basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons.

3. The wireless device of claim 2, wherein:
the wireless device comprises a smartphone; and
the basic features comprise a simple phone.

4. The wireless device of claim 2, wherein:
the wireless device comprises a smartphone; and
the basic features comprise a phone with no application icons.

5. The wireless device of claim 2, wherein:
the wireless device comprises a smartphone; and
the basic features comprise a feature phone.

6. The wireless device of claim 2, wherein:
the wireless device comprises a smartphone; and
the basic features comprise at least one of the following: a phone with phone and text only capability and a phone with phone only capability.

7. The wireless device of claim 1, wherein the processor is further configured to implement the wireless device as a smartphone in response to not sensing the triggering component.

8. The wireless device of claim 1, wherein:
the processor is further configured to receive a selection from a user of features associated with the basic features; and
the processor is further configured to implement the transition application in response to a triggering component to implement the graphical user interface displayed by the display to implement basic features selected by the user.

9. The wireless device of claim 1, wherein the triggering component comprises the camera device operating in response to the machine-readable code;
the processor further configured to implement the transition application in response to the triggering component to implement the graphical user interface displayed by the display to implement basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons.

10. The wireless device of claim 1, wherein the triggering component comprises the SIM card;
the processor further configured to implement the transition application in response to the triggering component to implement the graphical user interface displayed by the display to implement basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons.

11. A wireless device process configured to operate a wireless device as both a smart phone and a phone having basic features comprising:
storing a transition application in a memory;
implementing the transition application in response to a triggering component with a processor;
displaying a graphical user interface with a display for controlling operation of the processor of the wireless device and the wireless device; and
implementing the transition application with the processor in response to a triggering component to load basic features into the wireless device to modify operation of the wireless device to implement the basic features including to implement the graphical user interface displayed by the display to implement the basic features;
implementing the transition application in response to the triggering component with the processor to generate a graphical user interface configured to receive a selection of a mode of operation of the basic features; and
implementing the transition application with the processor to implement the selection of the mode of operation of the basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons; and
wherein the triggering component comprises at least one of the following: an NFC device operating in response to an NFC target, a camera device operating in response to a machine-readable code, and a SIM card.

12. The wireless device process of claim 11, wherein the triggering component comprises the NFC device operating in response to the NFC target;
implementing the transition application in response to the triggering component to implement the graphical user interface displayed by the display to implement basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons.

13. The wireless device process of claim 12, further comprising:
wherein: the wireless device comprises a smartphone; and the basic features comprise a simple phone.

14. The wireless device process of claim 12, further comprising:
wherein: the wireless device comprises a smartphone; and the basic features comprise a phone with no application icons.

15. The wireless device process of claim 12, further comprising:
wherein: the wireless device comprises a smartphone; and the basic features comprise a feature phone.

16. The wireless device process of claim 12, further comprising:
wherein the basic features comprise at least one of the following: a phone with phone and text only capability and a phone with phone only capability.

17. The wireless device process of claim 11, wherein the processor is further configured to implement the wireless device as a smartphone in response to not sensing the triggering component.

18. The wireless device process of claim 11, wherein:
the processor is further configured to receive a selection from a user of features associated with the basic features; and
the processor is further configured to implement the transition application in response to a triggering component to implement the graphical user interface displayed by the display to implement basic features selected by the user.

19. The wireless device process of claim 11, wherein the triggering component comprises the camera device operating in response to the machine-readable code;
the processor further configured to implement the transition application in response to the triggering component to implement the graphical user interface displayed by the display to implement basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons.

20. A computer program product comprising non-transitory computer instructions to operate a wireless device as both a smart phone and a phone having basic features when the non-transitory computer instructions are executed on a processor of a wireless device, instructions comprising:
storing a transition application in a memory;
implementing the transition application in response to a triggering component with the processor;
displaying a graphical user interface with a display for controlling operation of the processor of the wireless device and the wireless device; and
implementing the transition application with the processor in response to a triggering component to load basic features into the wireless device to modify operation of the wireless device to implement the basic features including to reconfigure the graphical user interface displayed by the display to implement the basic features;
implementing the transition application in response to the triggering component with the processor to generate a graphical user interface configured to receive a selection of a mode of operation of the basic features; and
implementing the transition application with the processor to implement the selection of the mode of operation of the basic features,
wherein the basic features comprise at least one of the following: a feature phone, a simple phone, a standard cell phone, a phone with limited functionality, a phone with phone and text only capability, a phone with phone only capability, a phone with limited features, a phone with limited graphical user interface features, a phone with simplified features, a phone with a simplified graphical user interface features, a phone with no application icons; and
wherein the triggering component comprises at least one of the following: an NFC device operating in response to an NFC target, a camera device operating in response to a machine-readable code, and a SIM card.

* * * * *